US005660446A

United States Patent [19]
Weatherly

[11] Patent Number: 5,660,446
[45] Date of Patent: Aug. 26, 1997

[54] DUMP TRAILER WITH MULTI-STAGE HOPPER

[76] Inventor: Edison Pernell Weatherly, 302 Bridge St., Columbia, N.C. 27925

[21] Appl. No.: 622,675

[22] Filed: Mar. 26, 1996

[51] Int. Cl.$^6$ ................................................ B60P 1/28
[52] U.S. Cl. ................................... 298/8 R; 298/12
[58] Field of Search ........................... 298/8 R, 8 H, 298/8 T, 1 A, 12

[56] References Cited

U.S. PATENT DOCUMENTS

| | | | |
|---|---|---|---|
| 3,193,330 | 7/1965 | Hribar, Jr. | 298/8 |
| 3,361,477 | 1/1968 | Pitts | 298/8 R |
| 3,771,829 | 11/1973 | Breazeale et al. | 298/17 R |
| 4,111,485 | 9/1978 | Martin et al. | 298/8 R |
| 4,659,147 | 4/1987 | Smiltneek | 298/20 R |
| 4,877,293 | 10/1989 | French et al. | 298/17 R |
| 4,943,118 | 7/1990 | Davis | 298/1 A |
| 5,267,779 | 12/1993 | Talamantez, Jr. et al. | 298/1 A |
| 5,344,271 | 9/1994 | Bratlie et al. | 414/385 |

*Primary Examiner*—Karen B. Merritt
*Assistant Examiner*—Gregory A. Morse
*Attorney, Agent, or Firm*—John D. Gugliotta; David L. Volk

[57] ABSTRACT

An otherwise conventionally pivotal dumping primary hopper is disclosed having in addition to a discharge gate an entry door at the front and a receiving track within the bottom of the hopper. A traversing, nesting secondary hopper having a second discharge gate rides along a traversing rail ahead of the primary hopper. With the primary hopper emptied, a gear reduction drive is utilized to thrust the secondary hopper along the traversing rail, through the entry door, and into the primary hopper along the receiving track.

7 Claims, 7 Drawing Sheets

# DUMP TRAILER WITH MULTI-STAGE HOPPER

BACKGROUND OF INVENTION

1. Field of the Invention

The present invention relates generally to dump truck trailers and more specifically to a dump trailer which is capable of storing and dumping two separate loads of goods.

2. Description of the Related Art

Semi trucks with dump trailers are commonly utilized to move or haul large quantities of dirt, gravel, grains, or the like and then to dump it into stockpiles or to spread it over an area. Semi trailers are designed to split the load weight between the fifth wheel and the rear axle. In order to comply with bridge load laws, the wheel axles are spaced apart a minimum distance of approximately 32 feet. The cargo box generally extends from the fifth wheel to the end of the trailer over the rear axle.

However, if the box is used as a dump box, there is a tendency for the trailer to tip when the box is elevated because of the extreme height a long box reaches during the dumping process. This can be caused by uneven loading of the box, uneven or soft ground conditions, or if the box is exposed to high wind conditions. The risk of tipping creates a considerable financial liability to the owner and/or operator and a serious safety hazard to the operator and spectators around the truck while dumping. To minimize this effect, existing dump trailers have been reduced in length with a corresponding decrease in payload. Currently only a single load of goods may be carried at one time. Therefore, the vehicle must make multiple trips to haul all of the goods needed. As a result many improvements in the method of an apparatus for hauling and dumping material have been developed.

For example, in U.S. Pat. No. 5,344,271, issued in the name of Bratlie et al., a trailer dumper is disclosed having a low profile tipper with a little deck which can be utilized for successfully removing the contents from a plurality of trailers.

Also, in U.S. Pat. No. 4,877,293, issued in the name French et al., a load bridging dump trailer is disclosed having a cargo box pivotally mounted on the rear end of a trailer frame thereby allowing the cargo box to be pivoted thereon.

And, in U.S. Pat. No. 4,659,147, issued in the name of Smiltneek, a dump trailer is disclosed having a towable, dumpable trailer capable of dumping without the need for hydraulic or electrical devices.

Again, in U.S. Pat. No. 3,771,829, issued in the name Breazeale et al., a dump trailer is disclosed utilizing an extended drive shaft in order to remotely drive a hitched dump trailer portion.

Finally, U.S. Pat. No. 3,193,330, issued in the name Hriear Jr., a dump trailer is disclosed similar to that in the Breazeale et al, reference but utilizing a hydraulic take off rather than a mechanical drive shaft.

In spite of all these improvements, a need is still felt for an apparatus which can increase the payload of a dumping trailer, minimize the required dumping height, reduce financial risk, improve safety, and cut insurance costs, as well as provide a separable method of carrying more than one payload.

SUMMARY OF THE INVENTION

It is therefore an object of the present invention to provide an improved dumping trailer with a multiple stage hopper.

It is additional object of the present invention to provide an improved dumping trailer with an increased payload capacity.

An overall object of the present invention is to provide an improved dumping trailer with a multistage hopper which minimizes the required dumping height.

It is a further object of the present invention to provide an improved dumping trailer with increased safety for the operator and bystanders.

Yet another object of the present invention is to provide an improved dumping trailer with reduced financial liability and insurance cost to the owner and/or operator.

It is a feature of the present invention to provide a trailer with two separate hoppers, a primary hopper fixed with a secondary hopper being traversable along the length of the trailer.

Briefly described according to the preferred embodiment of the present invention, an otherwise conventionally pivotal dumping primary hopper is provided having in addition to a discharge gate an entry door at the front and a receiving track within the bottom of the hopper. A traversing, nesting secondary hopper, also with a discharge gate, rests on a tubular subframe ahead of the primary hopper. Both the primary and the secondary hoppers are loaded in an otherwise conventional manner as is currently available in the relevant art. The primary hopper is also emptied in a conventional manner, such as with a pivoting means securing one end and lifting means to lift the other end of the primary hopper. With the primary hopper emptied, it is returned to its original horizontal position, and a hopper travel means is then utilized to thrust the secondary hopper along the tubular subframe, through the entry door, and into the primary hopper along the receiving track. The rearward motion of the secondary hopper is halted by stops affixed to the two front corners of the secondary hopper when they come into contact with the walls of the primary hopper. In this nested configuration, the primary hopper dumping means can again be actuated, thereby emptying the secondary hopper.

An advantage of the present invention is that it can be utilized with many conventional methods of dumping a dump trailer hopper.

Another advantage of the present invention is that an increased dumping capacity can be achieved which minimizes the required dumping height, thereby reducing financial liability and increasing safety.

An additional advantage of the present invention is that an increased payload capacity can be achieved.

Further a preferred embodiment of the present invention can be used to carry and dump multiple loads utilizing a single transportation device.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

1. Detailed Description of the Figures

Figure 1:
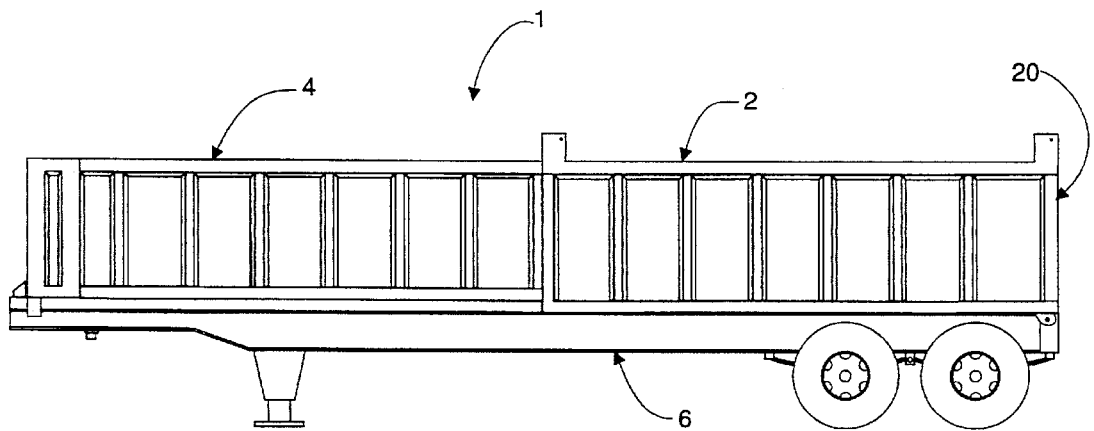
FIG. 1 is a side view of a dump trailer with multistage hopper according to the preferred embodiment of the present invention.
Figure 2:
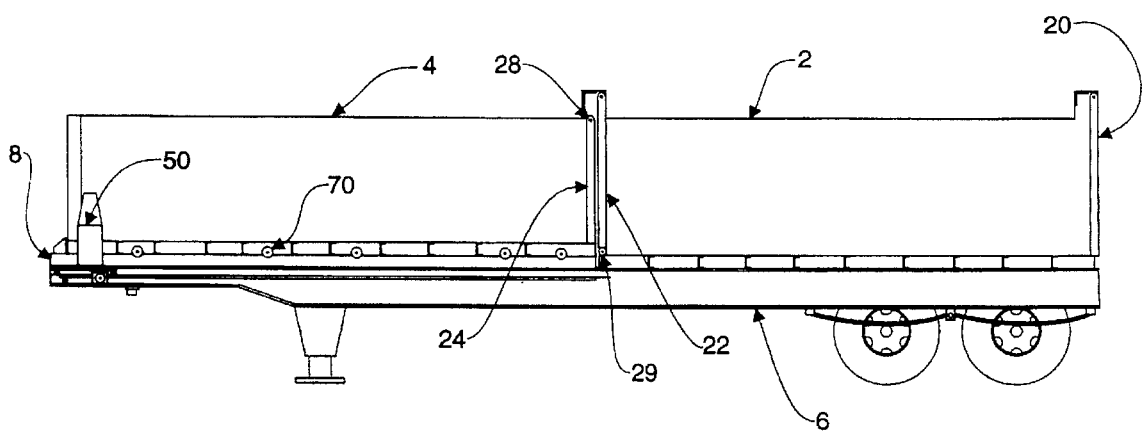
FIG. 2 is a longitudinal cross-section view of the multistage hopper utilized therewith.
Figure 3:
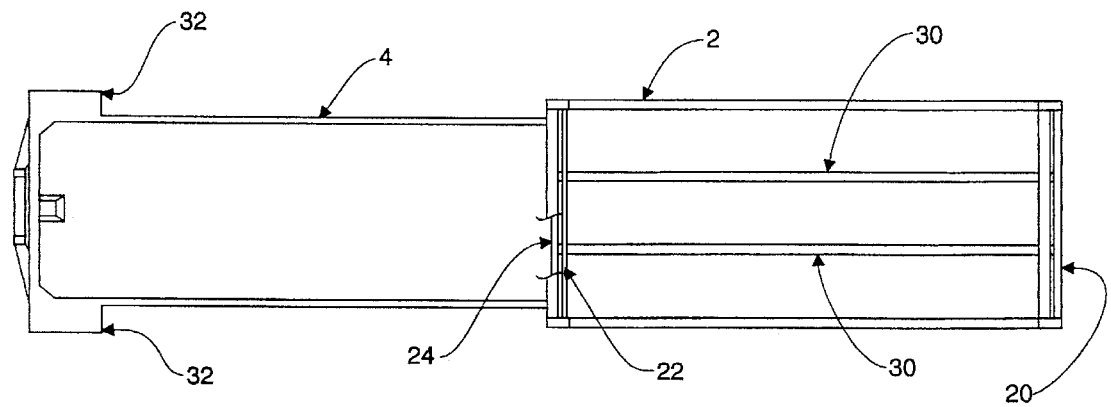
FIG. 3 is a top plan view thereof.
Figure 4:
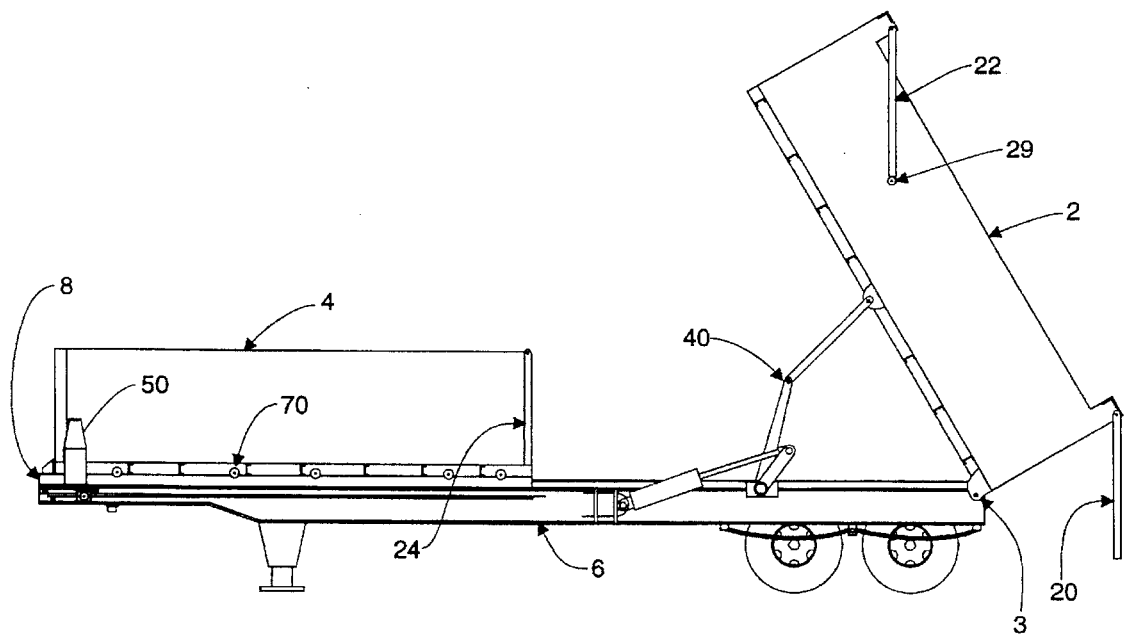
FIG. 4 is a detailed cross-section side view of a conventional lifting means.

Referring now to FIGS. 1–3, a dump trailer 1 is shown, according to the present invention, having a primary pivotal dumping hopper 2 and a secondary traversing, nesting hopper 4. The primary hopper 2 operates in an otherwise conventional manner as is currently available in the relevant art, and is shown in FIG. 4 having a pivoting means 3 at one end and a lifting means 40 beneath. It is currently envisioned that in order to provide smooth, easy nesting of the hoppers, the primary hopper 2 should also have a receiving track 30 aligned along the bottom in order to guide and support the secondary hopper 4 while in a nested position. A pair of supporting beams 6 span the length of the trailer to form a chassis which supports both hoppers. A tubular subframe 8 is affixed to the supporting beams 6 beneath the secondary hopper 4. The tubular subframe 8 guides and aligns the secondary hopper 4 with the receiving track 30 affixed in the bottom of the primary hopper 2 during nesting. A hopper travel means 10 is provided for imparting a moving force to the secondary hopper 4, as will be described in further detail.

As is shown in greater detail in FIGS. 2–4, the primary hopper 2 has a first tailgate 20, hinged at the top, which pivots open to the rear when the primary hopper 2 is pivoted upward for dumping. A headgate 22 is also provided at the opposite end of the primary hopper 2, and operates in a similar manner. Further, the secondary hopper 4 is also provided with a second tailgate 24. Tailgates 20 and 24 are provided with a conventional latching means for control by the truck driver during transit and dumping. Headgate 22 is provided with a stop to prevent movement past vertical in the forward direction. A pair of first rollers 28 are mounted along the top of second tailgate 24 to smoothly open headgate 22 and first tailgate 20 during traversal of the secondary hopper 4 into nesting position in primary hopper 2. Second rollers 29 are provided at the bottom corners of headgate 22 to allow smooth movement of hopper 4 under headgate 22.

Figure 5:
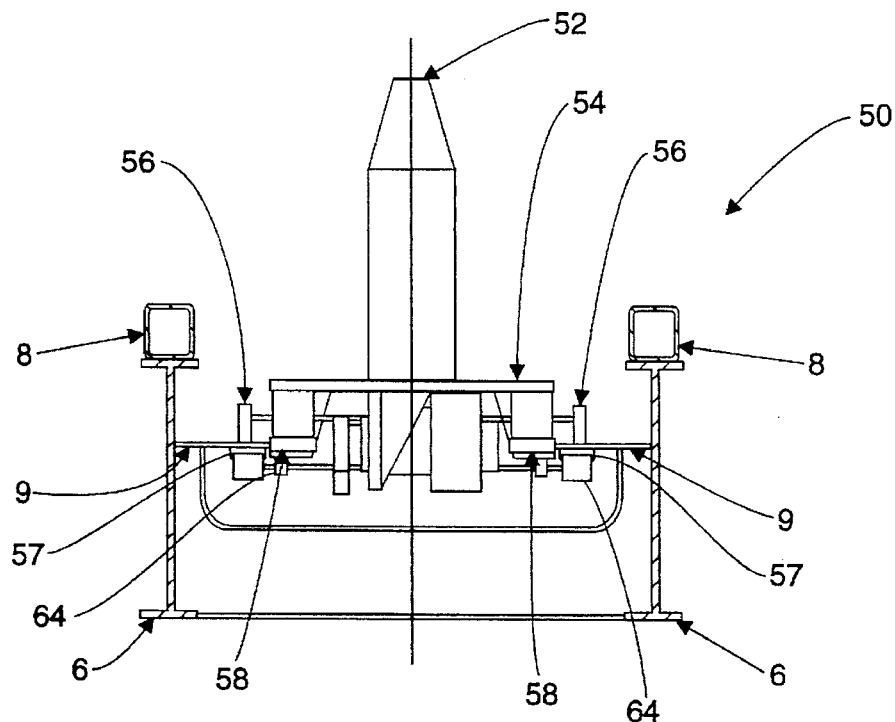
FIG. 5 is a detailed traverse cross-section of a guide plate 50.
Figure 6:
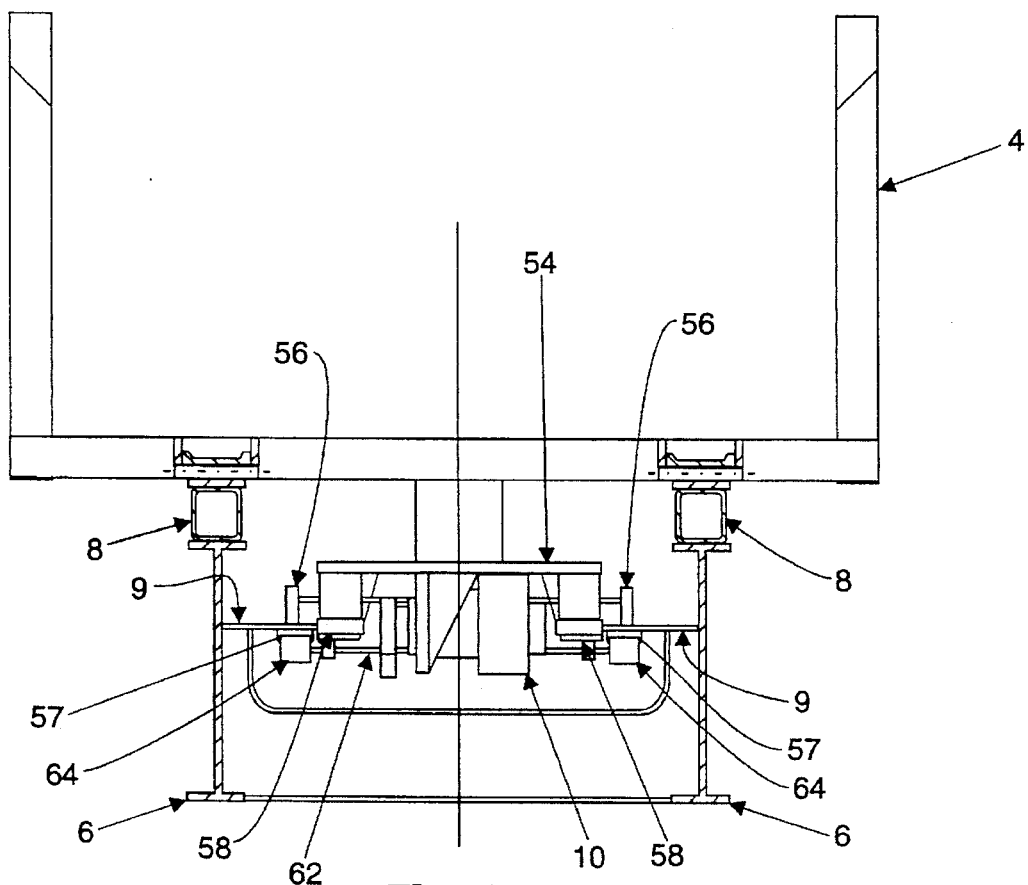
FIG. 6 is a detailed cross-section of hopper 4 and travel means 10.
Figure 7:
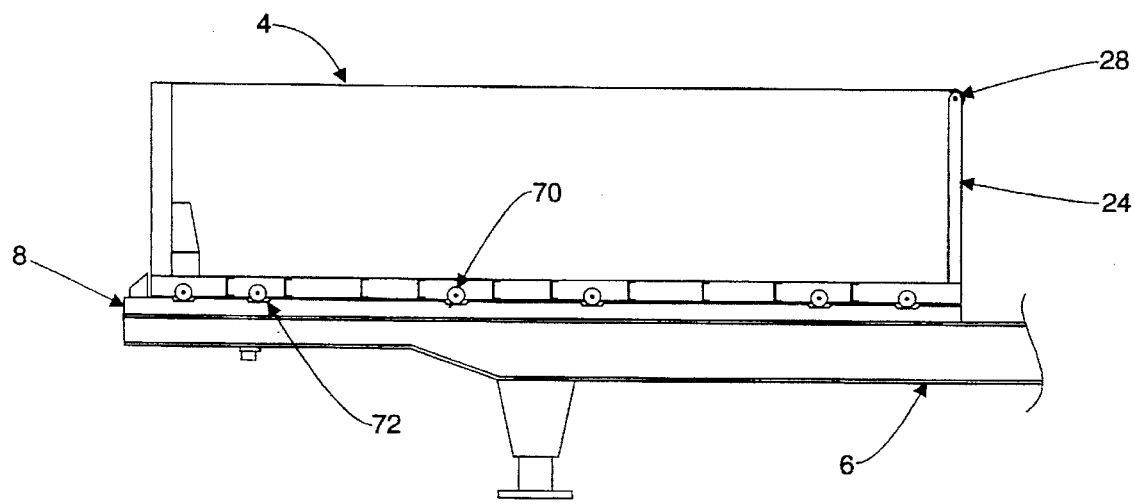
FIG. 7 is a detailed side view of a secondary nesting hopper 4 resting slidably on a tubular subframe 8 positioned for highway transit.
Figure 8:
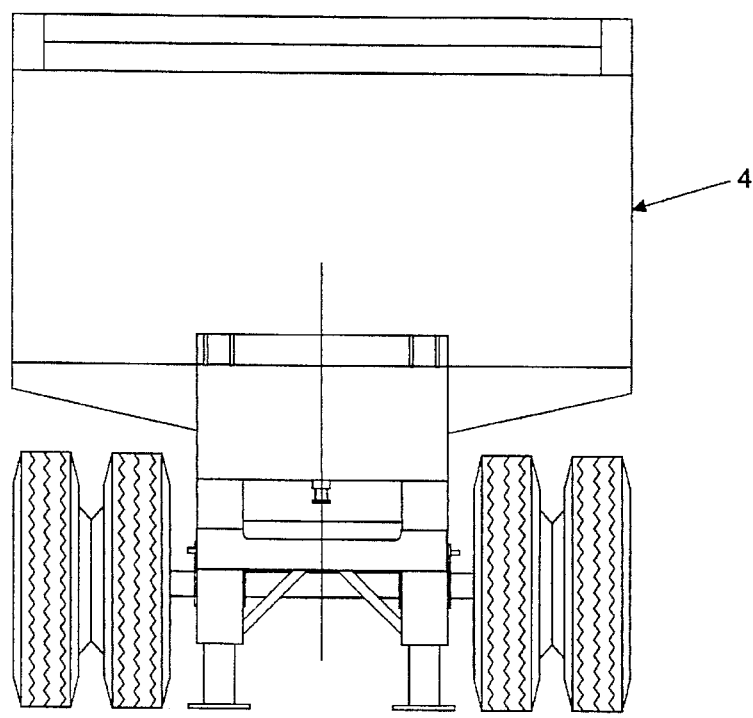
FIG. 8 is a detailed front view of a secondary nesting hopper 4.
Figure 9:
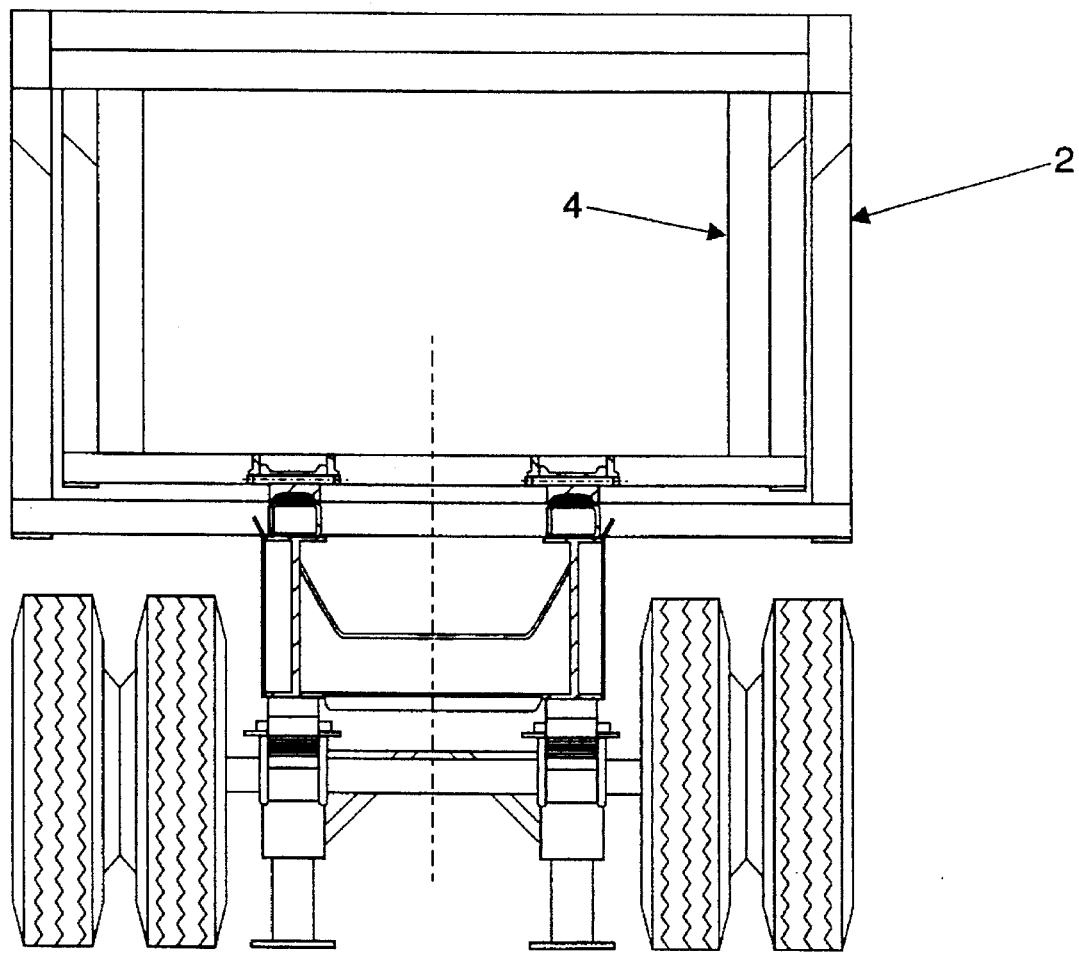
FIG. 9 is a detailed rear view of a secondary nesting hopper 4 inside of a primary hopper 2.

As shown in FIG. 2, a guide plate 50 is provided which travels along a pair of guide tracks 9, and is shown in greater detail in FIG. 5 and FIG. 6. A nesting hopper attachment means, shown here as an alignment pin 52 affixing to the underside of the secondary hopper 4, is mounted to travel plate 54. The travel plate 54 has a plurality of support wheels 56 and alignment wheels 58 mounted thereto. The support wheels 56 run on top of guide tracks 9 which are attached to supporting beams 6. Alignment wheels 58 run against the end of guide tracks 9 to hold travel plate 54 centered, thereby forming a guided track to allow for lateral movement of the guide plate 50. As shown in FIGS. 5, 6 and 7, the secondary nesting hopper 4 includes support wheels 70 connected thereto, which travel on and along the tubular subframe 8, and support the hopper 4 in a rolling manner. Recesses 72 are provided in tubular subframe 8 for the wheels 70 to settle into when secondary hopper 4 is in the full-forward position, thereby providing support for the secondary hopper 4 directly on the tubular subframe 8 during loading and transit.

Referring to FIGS. 5 and 6, attached to the underside of the travel plate 54 is a hopper travel means 10. Hopper travel means 10 imparts rotational torque to drive shaft 62, which rotates a plurality of pinion gears 64 mounted at each end. Pinion gears 64 mesh with a pair of gear racks 57, which are affixed to the underside of guide tracks 9, causing lateral movement of guide plate 54. By reversing the rotational direction of the hopper travel means 10, the hopper 4 is retracted.

In its preferred embodiment the hopper travel means 10 is a hydraulic motor driven gear reduction drive.

2. Operation of the Preferred Embodiment

Figure 10:
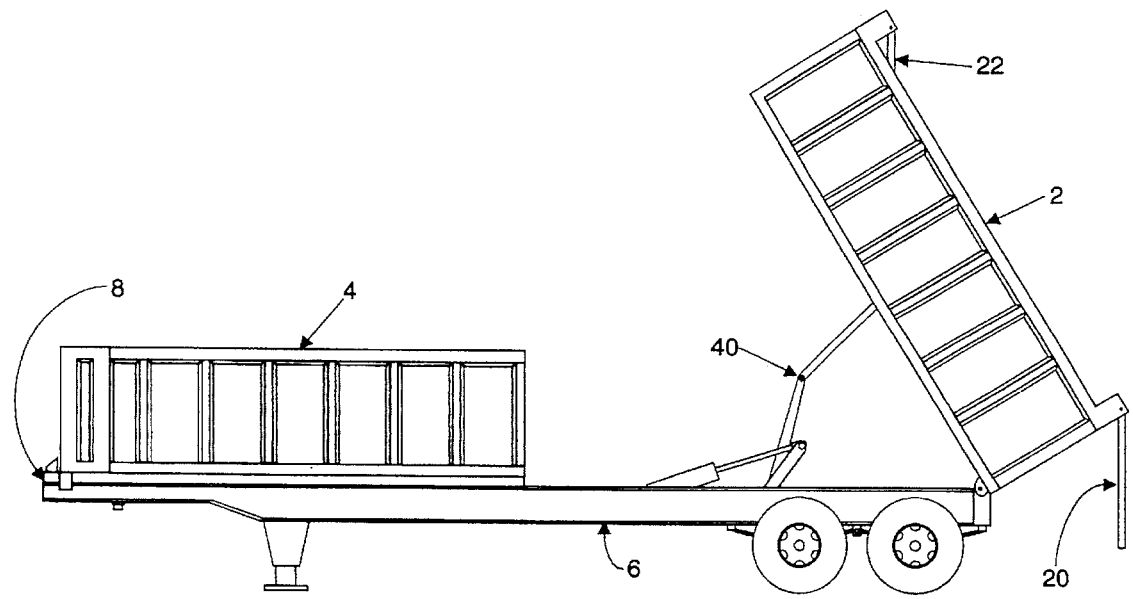
FIG. 10, FIG. 11, and FIG. 12 are side views showing the operation of the preferred embodiment of the present invention.
Figure 11:
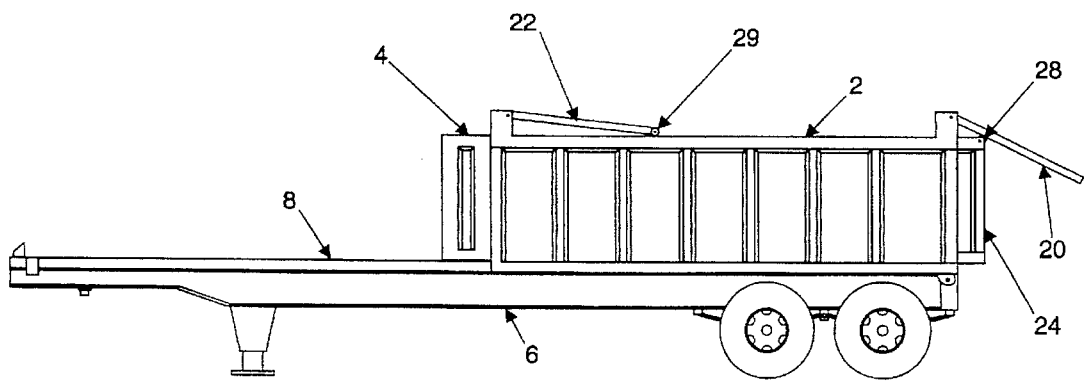
Figure 12:
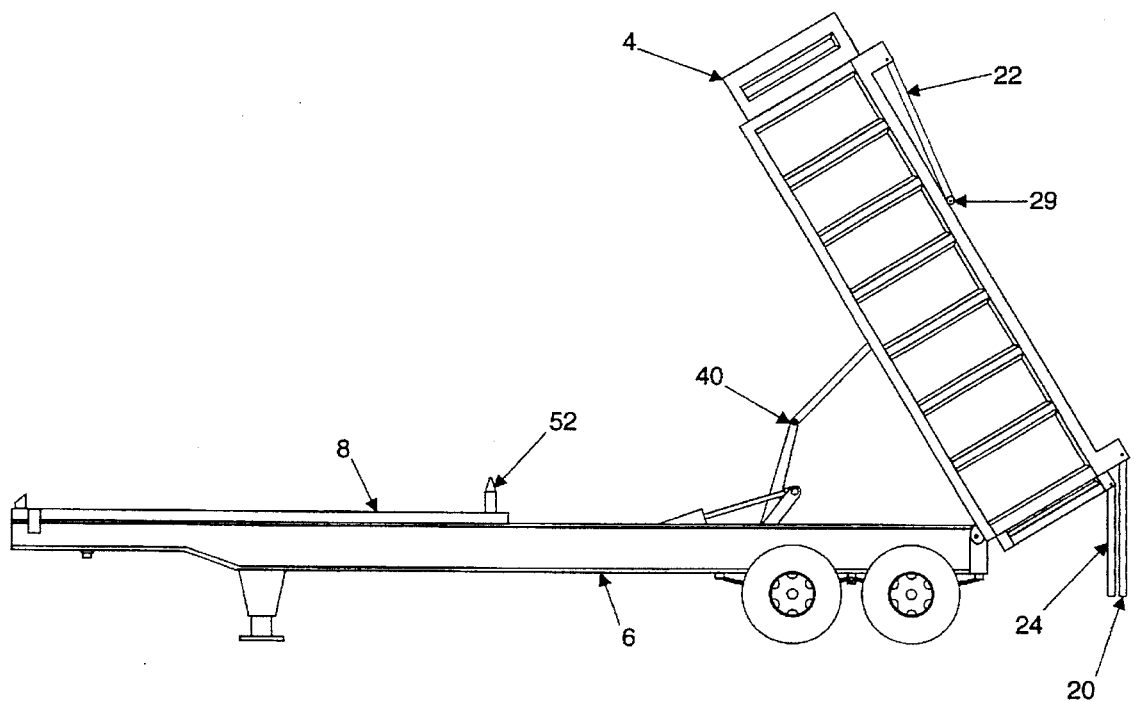

To use the present invention, as shown in FIG. 10, FIG. 11, and FIG. 12 the primary hopper 2 is first emptied in a conventional manner and returned to the horizontal position. In order to empty the secondary hopper 4, the secondary hopper 4 is traversed along the tubular subframe 8 by the hopper travel means 10 and into the primary hopper 2. During traversal of the secondary hopper 4, first rollers 28, mounted along the top of second tailgate 24, make contact with and open headgate 22 and first tailgate 20 of primary hopper 2. The secondary hopper 4 can then be emptied in a manner similar to that of the primary hopper 2. Upon completion, the secondary hopper 4 is moved back into its original position by hopper travel means 10. Finally, secondary hopper 4 is locked down and tailgates 20 and 22 latched closed for transit and reloading.

The foregoing description is included to illustrate the operation of the preferred embodiment and is not meant to limit the scope of the invention. The scope of the invention is to be limited only by the following claims.

What is claimed is:

1. A dump trailer with multistage hopper comprising:

a pivotal dumping primary hopper having a first discharge gate capable of swinging open and located at the rear, an entry door at the front, and a receiving track within the bottom of said primary hopper;

pivoting means securing the rear of said primary hopper to said dump trailer for pivoting said primary hopper;

lifting means beneath said primary hopper affixed to both said dump trailer and said primary hopper for lifting the primary hopper in a pivotal manner about said pivoting means;

a traversing, secondary hopper fittable in a nesting manner through said entry door and into said primary hopper;

said secondary hopper having support wheels connected thereto and positioned on a tubular subframe;

second discharge gate located on said secondary hopper in a pivotal manner capable of swinging open;

said tubular subframe ahead of said primary hopper and aligned with said receiving track for supporting and guiding said secondary hopper;

structure forming recesses in said tubular subframe, said recesses having a similar interspacing to said support wheels and positioned ahead of said primary hopper so that said support wheels will settle into said recesses when said secondary hopper is fully ahead of said primary hopper;

hopper migration means for providing thrust to said secondary hopper.

2. The dump trailer with multistage hopper as described in claim 1, wherein said hopper migration means is affixed in a disengageable manner to said secondary hopper.

3. The dump trailer with multistage hopper as described in claim 1, further comprising traversing means affixed beneath said secondary hopper for aiding in traversing said secondary hopper along said tubular subframe.

4. The dump trailer with multistage hopper as described in claim 3, wherein said traversing means comprises a plurality of wheels affixed rotatingly to said secondary hopper.

5. A dump trailer with multistage hopper comprising:

a primary pivotal dumping hopper having a front and rear, said primary hopper also having a pivoting means at said rear and a lifting means beneath, said primary hopper further having a hinged first tailgate at said rear which pivots in a conventional manner when said primary hopper is pivoted upward;

a secondary traversing, nesting hopper having support wheels connected thereto and positioned on a tubular subframe;

a pair of trailer supporting beams spanning the length of and supporting both said hoppers;

said tubular subframe affixed beneath and guiding said secondary hopper;

structure forming recesses in said tubular subframe, said recesses having a similar interspacing to said support wheels and positioned ahead of said primary hopper so that said support wheels will settle into said recesses when said secondary hopper is fully ahead of said primary hopper;

a pair of grade tracks, each of said guide tracks attached to one of said supporting beams hopper travel means anchored to said nesting hopper for imparting a moving force to said secondary hopper; and a receiving track aligned along the bottom of said primary hopper for guiding and retaining said nesting hopper while in a nesting position.

6. The dump trailer with multistage hopper as described in claim 5, further comprising:

an alignment pin affixing to the underside of said secondary hopper;

a travel plate affixed beneath said alignment pin;

a plurality of support wheels mounted to said travel plate, said support wheels bearing on said guide tracks; and a plurality of alignment wheels mounted to said travel plate, said alignment wheels bearing against said guide tracks.

7. The dump trailer with multistage hopper as described in claim 6, wherein said hopper travel means comprises:

a pair of gear racks, each affixed to one of said guide tracks;

a plurality of pinion gears affixed to said travel plate such that each said pinion gear meshes with one of said gear racks;

a hydraulically powered, gear reduction drive affixed to said travel plate, for imparting rotational torque and rotating said pinion gears, thereby causing lateral movement of said guide plate.

* * * * *